US009109710B2

(12) United States Patent
Hasse et al.

(10) Patent No.: US 9,109,710 B2
(45) Date of Patent: *Aug. 18, 2015

(54) MULTIPLE-ADDITION VALVE FOR A SYSTEM FOR METERING LIQUID OR PASTE-LIKE AUXILIARY WASHING AGENTS

(75) Inventors: Torsten Hasse, Nauen (DE); Stephan Jung, Braunschweig (DE); Ingo Schulze, Panketal (DE)

(73) Assignee: BSH HAUSGERÄTE GMBH, Munich (DE)

( * ) Notice: Subject to any disclaimer, the term of this patent is extended or adjusted under 35 U.S.C. 154(b) by 1266 days.

This patent is subject to a terminal disclaimer.

(21) Appl. No.: 12/672,719

(22) PCT Filed: Aug. 5, 2008

(86) PCT No.: PCT/EP2008/060271
§ 371 (c)(1),
(2), (4) Date: Sep. 14, 2010

(87) PCT Pub. No.: WO2009/021874
PCT Pub. Date: Feb. 19, 2009

(65) Prior Publication Data
US 2011/0094543 A1    Apr. 28, 2011

(30) Foreign Application Priority Data
Aug. 10, 2007   (DE) .................. 10 2007 037 882

(51) Int. Cl.
*F16K 11/074* (2006.01)
*D06F 39/02* (2006.01)

(52) U.S. Cl.
CPC .......... *F16K 11/0743* (2013.01); *D06F 39/022* (2013.01)

(58) Field of Classification Search
CPC .................... F16K 11/0743; D06F 39/022
USPC ...................... 137/624.18; 134/99.1
See application file for complete search history.

(56) References Cited

U.S. PATENT DOCUMENTS

| 3,633,621 | A | * | 1/1972  | Myers ...................... 137/625.11 |
| 3,853,145 | A | * | 12/1974 | Judd ........................ 137/624.18 |
| 4,310,022 | A |   | 1/1982  | Cohen |
| 4,674,538 | A |   | 6/1987  | Yes |
| 4,707,150 | A | * | 11/1987 | Graham ........................ 384/481 |
| 6,098,646 | A |   | 8/2000  | Hennemann et al. |

(Continued)

FOREIGN PATENT DOCUMENTS

DE            3913838 A1    10/1990
DE       102007032759 A1     1/2009

*Primary Examiner* — Jason Ko
*Assistant Examiner* — Spencer Bell
(74) *Attorney, Agent, or Firm* — Nixon & Vanderhye, P.C.

(57) ABSTRACT

A system for automatically metering liquid or paste-like auxiliary washing agents stored in reservoirs for automatically controlled washing machines. It has a central fluid line disposed in a housing bottom and a plurality of nozzles disposed in the housing bottom on a circular line extending concentrically to the axis of a rotor. The nozzles can be connected individually to the outlet by a connecting line inside the motor-drivable rotor. In the connection to the connecting line, seals are provided. Due to a force continually axially acting on the rotor in the direction of the housing bottom, said rotor presses the seals until the contact surfaces of the rotor and the housing bottom substantially form a common plane.

17 Claims, 2 Drawing Sheets

(56) References Cited

U.S. PATENT DOCUMENTS 6,367,504 B1 4/2002 Knapp
6,415,670 B1 7/2002 Ohkura et al.
8,555,679 B2 * 10/2013 Schulze .................. 68/17 R

* cited by examiner

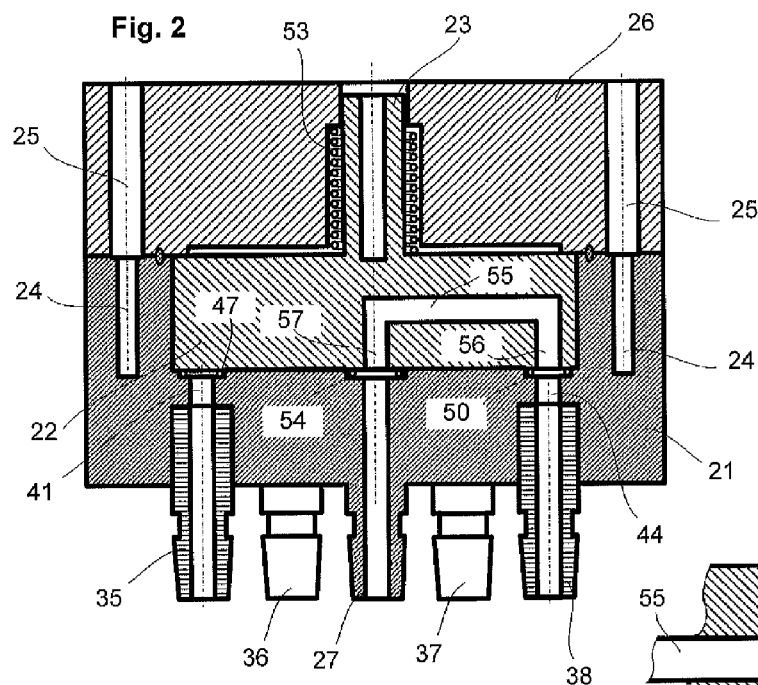
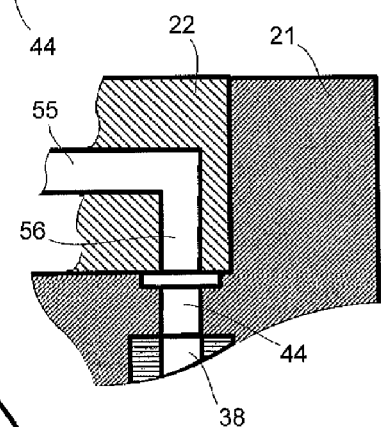
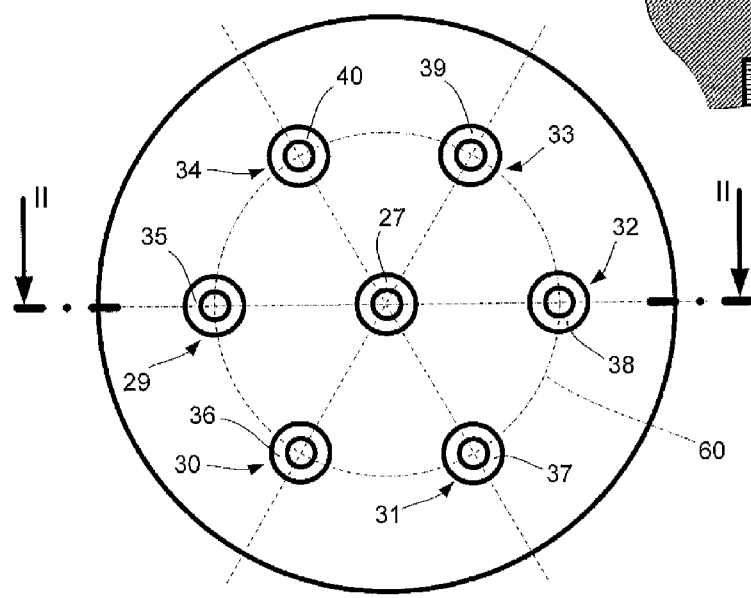

MULTIPLE-ADDITION VALVE FOR A SYSTEM FOR METERING LIQUID OR PASTE-LIKE AUXILIARY WASHING AGENTS

This application is a U.S. National Phase of International Patent Application No. PCT/EP2008/060271, filed Aug. 5, 2008, which designates the U.S. and claims priority to German Patent Application No. DE 10 2007 037 882.5, filed Aug. 10, 2007, the entire contents of each of which are hereby incorporated by reference.

BACKGROUND OF THE INVENTION

The invention relates to a multiple-addition valve for automatic metering of liquid or paste-like auxiliary washing agents held in reservoirs into automatically-controlled washing machines with a central fluid line disposed in a housing bottom and a number of nozzles arranged on a circular line arranged in the housing bottom concentrically to the axis of a rotor, which are able to be connected to the outlet by a connecting line inside the motor-drivable rotor and which have a seal for the connection with the connecting line.

A multiple-addition valve is known from DE 197 36 982 A1 for adding ready-to-use dilutions which have been produced from liquid or paste-like concentrated auxiliary washing agents held in reservoirs and a thinning liquid, preferably water. This multiple-addition valve is suitable for use in commercial washing machines in order to supply a number of machines with already premixed doses of ready-to-use dilutions from a central dispensing device for auxiliary washing agents via the fluid line. For this purpose the individual metered doses of stored auxiliary washing agents are thinned with water and then given to a multiple-addition valve called a "multiple-opening valve". From there they are distributed via the nozzles as a ready-to-use dilution to a plurality of washing machines.

As well having a variety of areas of application, the known multiple-addition valve is also a complex and expensive design. In particular an expensive mechanism is present through which the nozzles arranged in the housing bottom are always hydraulically separated from the connecting line arranged in the rotor before the rotor is to be rotated to the new position. For this purpose a spherical part of the connecting line is raised from a funnel of the nozzle and simultaneously relieves the strain on the surrounding annular seal. After moving into the new position the rotor must be lowered again so that the spherical part lowers into the funnel of the other nozzle and makes this seal. For raising and lowering the rotor a compressed-air cylinder is used which engages on the drive shaft of the rotor.

BRIEF SUMMARY OF THE INVENTION

The underlying object of the invention is to make a multiple-addition valve of the type described at the start usable for washing machines that are employed in a domestic environment and in which a concentrate of auxiliary washing agents is to be supplied from a number of reservoirs into a mixing chamber from where it is (preferably) thinned with water and mixed and subsequently is to be fed into the laundry treatment area of this one washing machine. A further and significant object to the invention is also that such a multiple-addition valve, because it is being used in a product of the consumer goods industry, must be an extraordinarily low-cost design but also have a lifetime of at least 10 years in which it must function in a stable and safe manner in normal use.

Inventively this object is achieved in that the multiple-addition valve first serves to add selected liquid or paste-type auxiliary washing agents in the manner in which each of the nozzles is connected to a reservoir and the fluid line is able to be connected via a pump with the dispensing device for a laundry handling area and that the rotor presses the seals through a force operating continuously axially on it in the direction of the housing bottom until the contact surfaces of the rotor and of the housing bottom essentially form a common plane. On the one hand this enables an expensive device for releasing the nozzle and connecting line transitions to be dispensed with. On the other hand the multiple-addition valve is made suitable by the described arrangement for selecting one of a number of auxiliary washing agents for a washing machine. The common plane of the rotor and of the housing bottom reduces the gap between them to almost zero and already forms a good seal between the individual nozzle transitions in this way. Since a force acting continuously on the rotor, e.g. a spring force, also has limits however, seals are also provided which enclose the transition points.

A system for automatic metering of a number of different auxiliary washing agents will have to be regularly cleaned. Systems are known for this purpose which flush out the lines of the system after or before each metering process (DE 10 2007 032 759.7 by the current applicant). In order to be provided with this option the inventive multiple-addition valve is advantageously developed in that one of the nozzles is provided for the supply of flushing fluid, preferably water and having no seal to the connecting line. In the event of it being activated, the nozzle can namely direct flushing water into the dispensing system in order to avoid undesired mixing between the subsequently metered auxiliary washing agent and the rest of the previously metered auxiliary washing agent. The lack of seal now also allows water to penetrate during flushing between the two surfaces of the rotor and the floor bottom and to thin any deposited residues of auxiliary washing agents deposited there and flush them away.

The force between the rotor and the floor bottom can be represented by a centrally arranged pressure ring between a housing cover of the multiple-addition valve and the upper rotor surface. This would enable this force to be set by dimensioning the pressure spring. Provided, in accordance with a further embodiment of the invention, the force is represented by a precise-fit positioning of the rotor in the housing bottom, this positioning can bring about a fixed setting of the force by the positioning being adjustable. For example the height of the housing cover can be adjustable by means of a screw and can be latched in this position.

BRIEF DESCRIPTION OF THE DRAWINGS

The seals consist for example of a highly-flexible material with a low Shore A hardness of between approximately 30 and approximately 40 Shore A hardness units, so that small tolerances in the height position can be compensated for by the flexibility of the seals.

The invention will be explained in greater detail below on the basis of an exemplary embodiment shown in the drawing. The figures show.

DETAILED DESCRIPTION OF EXEMPLARY EMBODIMENTS OF THE PRESENT INVENTION

Figure 1:
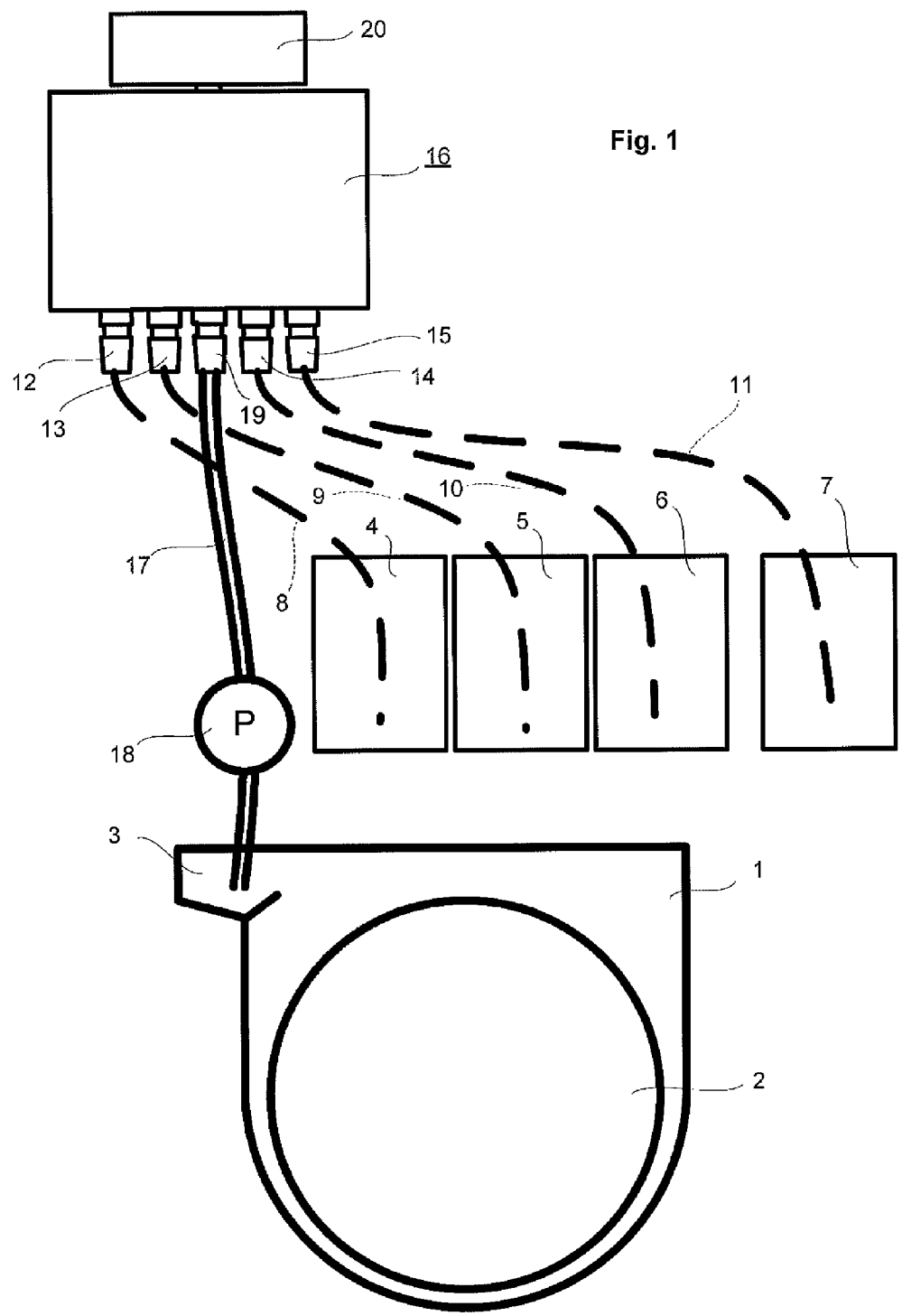
FIG. 1 a schematic diagram of a system for automatic metering of liquid or paste-like auxiliary washing agents held in reservoirs in a washing machine, FIG. 2 an inventively-designed multiple-addition valve in a vertical section along the cut line II-II in FIG. 4, FIG. 3 an enlarged detail view of the section in accordance with detail III in FIG. 2 for a variant with flushing of the contact surfaces and FIG. 4 a view of the underside of the housing bottom with the nozzles arranged on a circular track and centrally.

The system shown in FIG. 1 for automatic metering is shown greatly enlarged here in relation to the washing machine of which only the tub 1 and the washing drum 2 supported to rotate within it as well as a device 3 for adding auxiliary washing agents are shown schematically, so that its structure can clearly be seen. The device 3 generally serves to provide manually-metered powder-type or liquid auxiliary washing agent portions for dispensing by fresh water from a fresh water line not shown in the figure. In this metering system are arranged reservoirs 4 to 6 which are used to store larger amounts of different auxiliary washing agents. A further reservoir 7 is used in this example to store a sufficiently large amount of fresh water with which the lines that are wetted with concentrated auxiliary washing agents can be flushed out in a phase in which no auxiliary washing agent is currently being dispensed.

Each reservoir 4 to 7 is connected via a separate vacuum line 8 to 11 with a respective nozzle 12 to 15 of a multiple-addition valve 16 which supplies the dose from one of the respective reservoirs 4 to 7 via a fluid line 17, a pump 18 and the washing agent dispensing device 3 to the tub 1. In the multiple-addition valve 16—there exists, as will be explained further below—a switchable connecting line through which one of the nozzles 12 to 15 can optionally be connected to the central nozzle 19 of the fluid line 17. A geared motor 20 mounted on the other side of the multiple-addition valve 16, with a device known per se for determining its position, is used to this purpose. A control device not shown in the figure has information to control the geared motor in accordance with the desired auxiliary washing agent. Then the respective vacuum line, e.g. 8 of the container 4 is connected to the nozzle 19 of the fluid line 17 in order to suck out a corresponding dose of the auxiliary washing agent involved by means of the pump 18 for a duration likewise dimensioned by the control device and convey it into the tub 1.

After each auxiliary washing agent has been extracted the entire line path from the connecting line via the central nozzle 19, the fluid line 17 to the pump 18 can be flushed out with clear water. In the example shown the water is stored in the container 7 for this purpose and is sucked for the purposes of flushing via the vacuum line 11, the connecting line of the multiple-addition valve 16 and the central nozzle 19 to the pump 18. While the water is being conveyed, all supply lines involved are flushed and the diluted liquid is conveyed to the tub 1. Since the control device knows which of the stored auxiliary washing agents are not compatible with each other not every auxiliary washing agent has to be flushed away after each metering. Flushing out the line after metering an auxiliary washing agent which is not compatible with that of the following metering is sufficient if the action of the subsequently metered auxiliary agent were to be adversely affected or if both auxiliary agents react with one another and the reaction product is damaging in any given way. In any event such flushings increase the lifetime of an inventive multiple-addition valve 16.

An example of a multiple-addition valve 16 can be seen in FIGS. 2 to 4. It consists essentially of a housing bottom 21 with a well-fitting cavity for the rotor 22, which has a drive shaft 23 on its upper side. The motor 20 is coupled to this shaft 23. Holes 24 in the housing bottom 21 and 25 in the housing cover 26 which supports the shaft are used for screwing the two sections together.

Accommodated in the housing bottom are a central nozzle 27 and six nozzles 29 to 34 arranged on a concentric circle 28. While the central nozzle 27 is a one-piece component of the housing bottom 21, the nozzles 29 to 34 each consist of an insert 35 to 40 which is distributed at an equal distance from the central nozzle 27 and from the adjacent nozzle in each case. They are embodied so that the lines 8 to 11 and 17 consist of hoses and can be easily pushed on without releasing themselves again.

The mouths of the channels 41 to 46 assigned to the nozzle 27 or of the inserts 35 to 40 are provided with sealing ring seats into which the seals 47 to 52 are inserted. These seals consist of a highly-elastic material with a low Shore A hardness of approximately 30 to approximately 40 Shore A hardness units and are dimensioned so that in the relaxed state they project from the sealing ring seat. Only after the insertion of the rotor 22 does its underside—supported by a central pressure spring 53—press the sealing rings 47 to 52 together so heavily that the flat surfaces of the underside of the rotor 22 and the upper side of the rotor cavity in the housing bottom 21 make a snug fit against each other so that their surfaces maintain a defined minimum spacing. The same occurs with the sealing ring 54 of the central nozzle 27. For fluid connection of a respective nozzle 29 to 34 with the central nozzle 27 in the respective rotary position of the rotor 22, a connecting line 55 molded rigidly into the rotor 22 is used. Its mouth 56, according to the rotary position of the rotor 22, connects in each case with one of the mouths 41 to 46 of the nozzles 29 to 34 arranged distributed around the circle and its mouth 57 always connects to the central nozzle 27. In the rotary position shown in the figure the connecting line 55 connects the central nozzle 27 to the outer nozzle 32 (insert 38) so that the pump 18 draws a dose of flushing water from the reservoir 7 during operation.

In the variant shown in FIG. 3 the sealing ring 50 is absent in the channel 44 of nozzle 32 into which the insert 38 is pushed. This nozzle is connected to the suction line in 11 which is used to suck flushing water out of the reservoir 7. If the channel 44 is thus carrying flushing water, the missing seal can ensure that any wetting of the contact surfaces between housing bottom 21 and wrote 24 by auxiliary washing agents is flushed away and does not lead to reactions with other auxiliary washing agents. Such flushing-out can especially be promoted, instead of the suction principle presented here, by a pressure principle being applied in which there is pressure in the suction line 11 and then in the channel 44 which promotes a penetration of the flushing fluid between the contact surfaces.

The invention is not restricted to the exemplary embodiment presented. The suction nozzles 29 to 34 can also be arranged distributed on a spherical surface or on a cover surface of the housing bottom 21. The rotor 22 would have to be adapted accordingly. More or fewer nozzles can also be distributed around the circular line and their distribution does not have to be even; this is because a geared motor could also impart any given position to the rotor 22—within specific limits. Instead of the geared motor any other type of a drive means generating circular movements can be used. The form of the seals is also not fixed, nor is the type and form of spring (53) which presses the rotor 22 against the housing bottom 21. For example latching elements formed from plastic engaging with one another of the housing cover 26 or of the housing bottom 21 with such elements of the rotor 22 can impart a comparable spring effect. Screwing the housing cover 26 to the housing bottom 21 could also allow the pressing force to be adjusted. Also water does not necessarily have to be kept in a reservoir for flushing out the lines if it can be ensured that at a time at which flushing is required fresh water from the mains or comparatively heavily-thinned liquor from the tub 1 is available. To this end the line 11 merely has to be connected to the corresponding source.

The invention claimed is:

1. A washing machine comprising:
a multiple-addition valve that includes:
a housing bottom with a central fluid line;
a rotor having a connecting line, the connecting line having an outlet in communication with the central fluid line and an inlet, the rotor being positioned adjacent to the housing bottom, and the rotor being rotatable relative to the housing bottom;
a plurality of nozzles positioned opposite the rotor on the housing bottom and concentrically about a central axis of the rotor, each of the plurality of nozzles being individually connectable to the central fluid line via the connecting line;
a first seal structured to form a fluid seal with the outlet of the connecting line and the central fluid line;
a plurality of additional seals, each of the plurality of additional seals structured to form a fluid seal with the inlet of the connecting line and a corresponding one of the plurality of nozzles; and
a plurality of reservoirs, each of the plurality of reservoirs connected to a corresponding one of the plurality of nozzles,
wherein the central fluid line is connected to a dispensing device via a pump,
wherein the first seal and the plurality of additional seals are fixed on the housing bottom during rotation of the rotor,
wherein one of the plurality of nozzles is configured to supply water and is not associated with one of the plurality of additional seals, and
wherein the rotor is positioned against the housing bottom at a defined minimum distance such that the first seal and the plurality of additional seals are compressed by contact between a rotor surface and a housing bottom surface when the rotor is rotated relative to the housing bottom.

2. The washing machine of claim 1, wherein the rotor is positioned against the housing bottom with a force generated by a centrally arranged pressure spring located between a housing cover of the multiple-addition valve and an upper surface of the rotor.

3. The washing machine of claim 1, wherein the rotor is positioned against the housing bottom with a force generated by a precise-fit positioning of the rotor in the housing bottom.

4. The washing machine of claim 1, wherein the rotor is positioned against the housing bottom with a force generated by a precise-fit screwing of a housing cover onto the housing bottom with a defined space between the housing cover and the housing bottom.

5. The washing machine of claim 1, wherein the first seal and each of the plurality of additional seals comprises a highly-flexible material with a Shore A hardness of approximately 30 to approximately 40.

6. The washing machine of claim 1, wherein the housing bottom has a plurality of seats recessed from a surface adjacent the rotor, each of the plurality of seats corresponding to one of the plurality of nozzles, and each of the plurality of additional seals is positioned in a corresponding one of the plurality of seats.

7. A valve for a washing machine, comprising:
a housing bottom;
a rotor located within the housing and adjacent to the housing bottom, the rotor being rotatable relative to the housing in a plurality of rotary positions;
a plurality of nozzles positioned on the housing, the plurality of nozzles including a central nozzle positioned coaxially to an axis of rotation of the rotor and a plurality of additional nozzles positioned concentrically about the axis of rotation of the rotor;
a connecting line defined in the rotor, the connecting line having an inlet structured to provide fluid communication from one of the plurality of additional nozzles and to an outlet in fluid communication with the central nozzle when the rotor is positioned in a corresponding rotary position; and
a first seal structured to form a fluid seal between the outlet of the connecting line and the central nozzle; and
a plurality of additional seals, each of the plurality of additional seals structured to form a fluid seal between the inlet of the connecting line and a corresponding one of the plurality of additional nozzles,
wherein one of the plurality of additional nozzles is configured to supply water and is not associated with one of the plurality of additional seals, and
wherein the first seal and each of the plurality of additional seals are rotatably fixed to the housing bottom relative to rotation of the rotor.

8. The valve of claim 7, wherein the first seal and each of the plurality of additional seals projects above a surface of the housing bottom that is adjacent to the rotor in a relaxed state, and
wherein the first seal and each of the plurality of additional seals are structured and positioned to be compressed by the rotor when the valve is assembled.

9. The valve of claim 7, wherein a surface of the housing bottom adjacent the rotor comprises a plurality of recessed seats, the first seal and each of the plurality of additional seals being positioned in a corresponding one of the plurality of recessed seats.

10. The valve according claim 7, wherein the first seal and each of the plurality of additional seals comprises a highly-flexible material with a Shore A hardness of approximately 30 to approximately 40.

11. The valve of claim 7, further comprising a housing cover,
wherein the rotor is positioned adjacent to the housing bottom to compress the first seal and each of the plurality of additional seals by a force generated by a spring positioned between a housing cover and the rotor, by screws to force the housing cover against the rotor, or precise-fit positioning of the rotor adjacent to the housing bottom.

12. The valve of claim 7, wherein the rotor is positioned a defined minimum distance from the housing bottom such that the first seal and each of the plurality of additional seals are compressed between the rotor and the housing bottom during rotation of the rotor.

13. A washing machine comprising:
a tub;
the valve of claim 7;
a plurality of reservoirs, each of the plurality of reservoirs being in fluid communication with one of the plurality of additional nozzles, and each of the plurality of reservoirs structured to contain a washing agent;
a central fluid line in fluid communication with the central nozzle; and a pump configured to pump the washing agent from one of the plurality of reservoirs, through the valve and into the tub via the central fluid line.

14. A method for dispensing washing agents in a washing machine, the method comprising:
   instructing a motor with a controller to rotate a rotor relative to a housing bottom to a first rotary position of a plurality of rotary positions, the rotor positioned adjacent to the housing bottom, the housing bottom having a central nozzle and a plurality of additional nozzles opposite the rotor, and the rotor having a connecting line with an inlet and outlet, the connecting line providing fluid communication between the central nozzle and a corresponding one of the plurality of additional nozzles; and
   instructing a pump to pump a first washing agent from a first reservoir of a plurality of reservoirs through a first additional nozzle of the plurality of additional nozzles and the connecting line to a tub of the washing machine via a central fluid line in fluid communication with the central nozzle and the tub when the rotor is in a first rotary position,
   wherein a central seal is compressed against a housing bottom surface by a rotor surface such that the central seal forms a fluid seal between the central nozzle and the outlet of the connecting line during rotation of the rotor,
   wherein a plurality of additional seals are compressed against the housing bottom surface by the rotor surface such that each of the plurality of additional seals forms a fluid seal between a corresponding one of the plurality of additional nozzles and the inlet of the connecting line during rotation of the rotor,
   wherein one of the plurality of additional nozzles is confused to supply water and is not associated with one of the plurality of additional seals, and
   wherein the central seal and the plurality of additional seals are rotatably fixed relative to the rotor during rotation of the rotor.

15. The method of claim 14, further comprising:
   instructing the motor with the controller to rotate the rotor from the first rotary position to a second rotary position such that a second additional nozzle of the plurality of additional nozzles is in fluid communication with the central nozzle through the connecting line; and
   instructing the pump to pump a second washing agent from a second reservoir of the plurality of reservoirs through the second additional nozzle and the connecting line to the tub of the washing machine via the central fluid line.

16. The method of claim 14, wherein the housing bottom comprises a plurality of seats recessed into the housing bottom, the central seal and each of the plurality of additional seals seated in a corresponding one of the plurality of seats.

17. The method of claim 14, wherein the central seal and each of the plurality of additional seals comprises a highly-flexible material with a Shore A hardness of approximately 30 to approximately 40.

* * * * *